United States Patent Office 3,442,900
Patented May 6, 1969

1

3,442,900
ENDOETHENO THEBAINES AND ORIPAVINES
Kenneth Walter Bentley, Willerby, Hull, England, assignor to Reckitt & Sons Limited, Hull, England
No Drawing. Continuation-in-part of application Ser. No. 478,738, Aug. 10, 1965, which is a continuation-in-part of application Ser. No. 262,249, Mar. 1, 1963. This application May 3, 1968, Ser. No. 726,592
Claims priority, application Great Britain, Mar. 2, 1962, 8,219/62; Nov. 12, 1962, 46,628/62
Int. Cl. C07d *33/00*; A61k *27/00*
U.S. Cl. 260—285
12 Claims

ABSTRACT OF THE DISCLOSURE

Thebaine and oripavine derivatives of the formula:

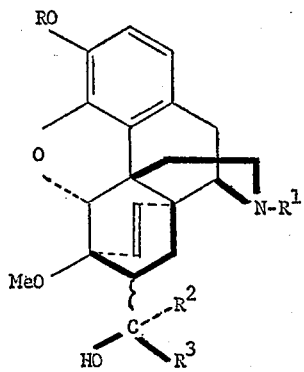

wherein:
R is hydrogen, methyl or acyl of $C_nH_{2n+1}CO$— wherein $n$ is an integer from 1 to 3, such as acetyl propionyl or butyryl;
$R^1$ is hydrogen, alkyl, or alkenyl of 2 to 8 carbon atoms, propargyl, cycloalkylmethyl of 4 to 6 carbon atoms such as cyclopropylmethyl or methylcyclopropylmethyl;
$R^2$ is hydrogen, alkyl of 1 to 3 carbon atoms, phenyl or tolyl; and
$R^3$ is cycloalkyl of 5 to 7 carbon atoms, alkyl or alkenyl of up to 8 carbon atoms or alkyl or alkenyl of up to 8 carbon atoms substituted on any one of the carbon atoms numbered 1 to 4 (the carbon atom numbered 1 being adjacent to the carbon atom bearing the alcoholic hydroxy group) by cycloalkyl of 5 to 7 carbon atoms, phenyl, alkoxy of 1 to 3 carbon atoms, phenoxy or tetrahydrofuryl, provided that when R is hydrogen or when $R^1$ is hydrogen, cyclopropylmethyl or methylcyclopropylmethyl, $R^3$ does not contain the system

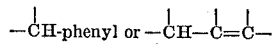

attached directly to the carbon atom bearing the alcoholic hydroxy group
and non-toxic pharmaceutically acceptable salts are useful as analgesics.

This application is a continuation-in-part of my copending application Serial No. 478,738, filed Aug. 10, 1965, which application is a continuation-in-part of my application Serial No. 262,249, filed March 1, 1963, now abandoned, inter alia.

The present invention is concerned with thebaine and oripavine derivatives and their non-toxic pharmaceutically acceptable salts which are useful as analgesics. More particularly, the thebaine and oripavine derivatives, according to the present invention, may be represented by the formula.

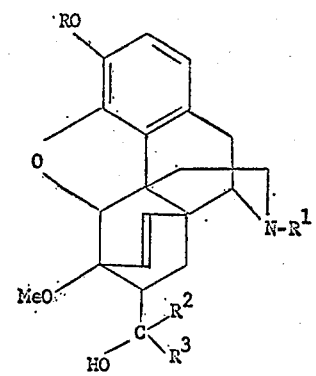

which compounds have a steric configuration according to compound I:

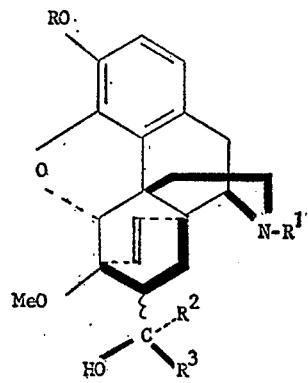

wherein:
R is hydrogen, methyl or acyl of $C_nH_{2n+1}CO$— wherein $n$ is an integer, such as acetyl, propionyl or butyryl;
$R^1$ is hydrogen, alkyl or alkenyl of 2 to 8 carbon atoms, propargyl, cycloalkylmethyl of 4 to 6 carbon atoms such as cyclopropylmethyl or methylcyclopropylmethyl;
$R^2$ is hydrogen, alkyl of 1 to 3 carbon atoms, phenyl or tolyl; and
$R^3$ is cycloalkyl of 5 to 7 carbon atoms, alkyl or alkenyl of up to 8 carbon atoms or alkyl or alkenyl of up to 8 carbon atoms substituted on any one of the carbon atoms numbered 1 to 4 (the carbon atom numbered 1 being adjacent to the carbon atom bearing the alcoholic hydroxy group) by cycloalkyl of 5 to 7 carbon atoms, phenyl, alkoxy of 1 to 3 carbon atoms, phenoxy or tetrahydrofuryl, provided that when R is hydrogen or when $R^1$ is hydrogen, cyclopropylmethyl or methylcyclopropylmethyl, $R^3$ does not contain the system

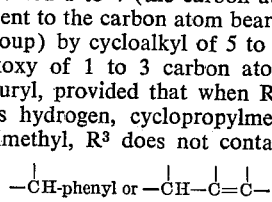

attached directly to the carbon atom bearing the alcoholic hydroxy group and non-toxic pharmaceutically acceptable salts thereof.

The compounds of the general Formula I in which R³ does not contain the system

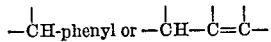

attached directly to the carbon atom bearing the alcoholic hydroxy group may be prepared by treating the tertiary bases of general formula:

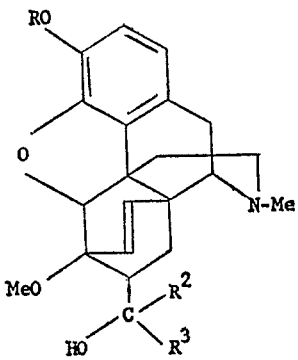

which compounds have a steric configuration according to Compound II:

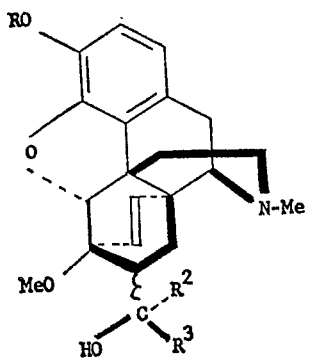

(II)

in which R, R² and R³ are as defined above with cyanogen bromide, followed by alkaline hydrolysis to give a compound of Formula I in which R¹ is hydrogen. The compounds of Formula II are described in United States patent application Serial No. 478,738.

The method of production of this secondary base depends on the O-substituents required, i.e., the value of R required. If R is to be methyl, then the secondary base may be produced by treating the N-cyano compound with an alkali metal hydroxide or alkoxide in a suitable solvent, such as diethylene glycol at 170° C., if R is to be hydrogen, the temperature must be of the order 210° C. This secondary base may be converted into the tertiary bases by treatment either with an alkyl alkenyl or alkynyl halide R¹X or with an aromatic sulphonyl ester of an alcohol of the formula R¹OH in which R¹ represents an alkyl group containing 2 to 8 carbon atoms or an alkenyl group containing 2 to 8 carbon atoms; or by acylation with a cycloalkyl carbonyl chloride containing 4 to 6 carbon atoms followed by a reduction with lithium aluminum hydride.

It is to be noted that demethylation, to the corresponding phenolic compounds (R=H), is not necessarily performed at the secondary base stage, as the above N-substituted oripavine compounds having R=H may be prepared directly from those compounds in which R¹ has a value other than CH₃ by treatment with alkali metal hydroxide or alkoxide in a suitable solvent such as diethylene glycol at a temperature of 210° C., which method is clearly part of the same general process.

The compounds of general Formula I may be prepared by a second method from the ketones of formula:

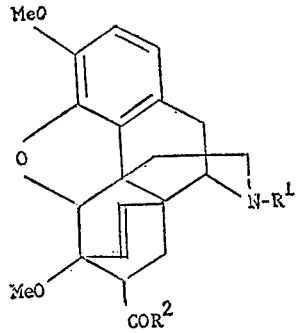

which compounds have a steric configuration according to Compound III:

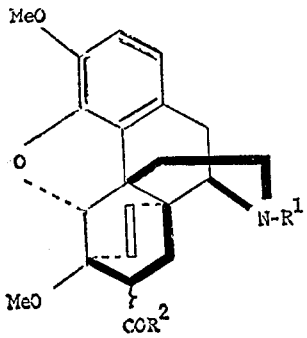

(III)

wherein R¹ represents an alkyl group containing 2 to 8 carbon atoms or an alkenyl group containing 2 to 8 carbon atoms while R² is as defined above, by treatment with Grignard reagents R³MgX in which R³ has the meaning above.

The ketones of Formula III may be prepared from ketones of formula:

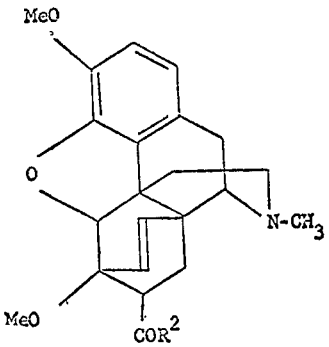

which compounds have a steric configuration according to Compopnd IV:

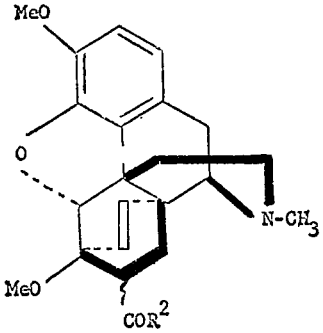

(IV)

by successive treatment with cyanogen bromide, dilute hydrochloric acid, sodium nitrite and finally the appropriate alkyl, alkenyl or alkynyl halide R¹X. The ketone of Formula IV may be prepared by the reaction of thebaine with a ketone of formula $CH_2=CH.COR^2$.

The compounds of Formula I may also be prepared by the treatment of compounds of Formula II in which R is a methyl group with equimolar concentrations of methyl or ethyl azodicarboxylate to give an addition product which is readily decomposed to the methylene bis-compounds by treatment with water. The by-products, formaldehyde and methyl or ethyl hydroazodicarboxylate are readily removed and good yields are obtained.

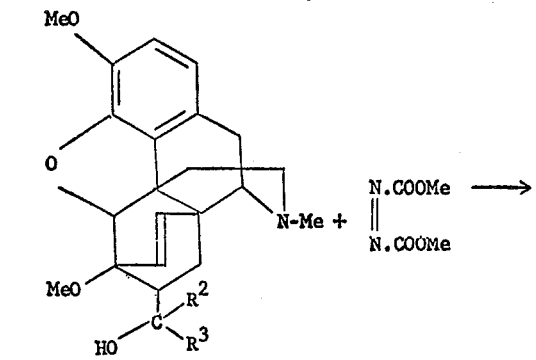

which compounds have a steric configuration:

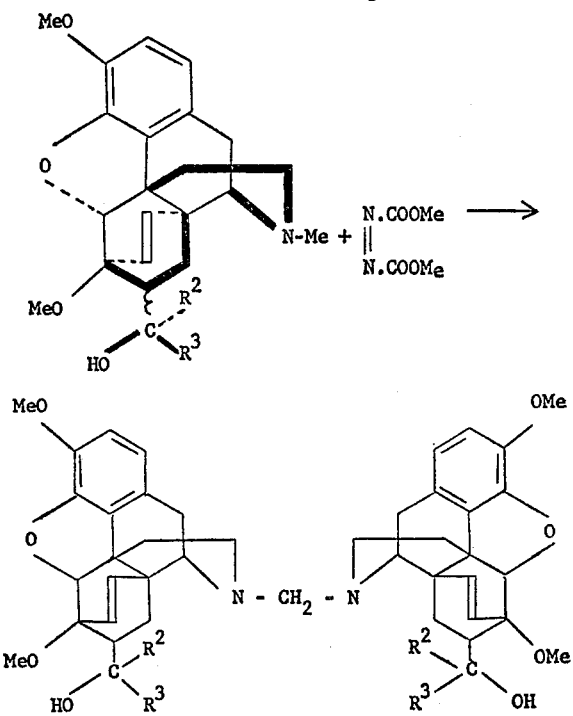

which compounds have a steric configuration:

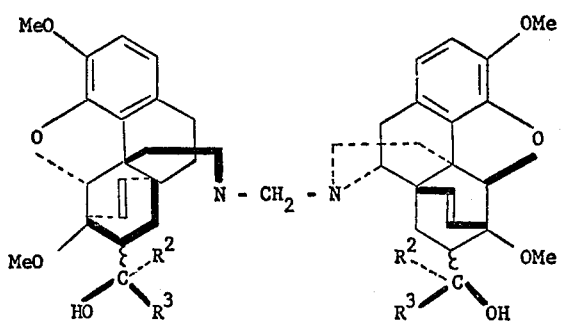

These methylene bis-compounds are converted into the tertiary bases by treatment either with an alkyl, alkenyl or alkynyl halide $R^1X$ in which $R^1$ represents alkyl of 2 to 8 carbon atoms or alkenyl of 2 to 8 carbon atoms; or by acylation with a cycloalkyl carbonyl chloride of 4 to 6 carbon atoms, followed by reduction with lithium aluminum hydride.

3-acyl esters of those compounds of structure I in which R is a hydrogen atom can be prepared by standard methods of acylation, e.g., by heating under reflux with an acid anhydride and the sodium salt of the corresponding acid or by treatment with an aqueous solution of an alkali metal hydroxide and an acid anhydride or chloride.

The following examples further illustrate the present invention wherein the parts are parts by weight:

Example 1.—6,14-endoetheno-7-(2-hydroxy-2-propyl)-tetrahydronorthebaine

A mixture of cyanogen bromide (4 parts), chloroform (25 parts) and 6,14-endoetheno - 7 - (2 - hydroxy-2-propyl)-tetrahydronorthebaine (9 parts) was kept at room temperature overnight and extracted with 2 N hydrochloric acid. The chloroform layer was separated, dried over sodium sulphate and evaporated. The residue was triturated with methanol and N-cyano-6,14-endoetheno-7-(2-hydroxy-2-propyl)-tetrahydronorthebaine (8.5 parts) M.P. 228° C. was obtained. This N-cyano-compound (57 parts) was added to a solution of potassium hydroxide (57 parts) in diethylene glycol (400 parts) and the mixture was stirred at 170° C. for 30 minutes, during which time ammonia was evolved. The mixture was then poured into stirred ice-water and the precipitated needles (M.P. 77° C.) were collected. The base on recrystallisation from water had M.P. 78° C. The hydrochloride, prepared in methanolic hydrogen chloride and recrystallized from methanol had M.P. 290° C. (dec.).

Example 2.—(a) 6,14-endoetheno-7-(2-hydroxy-2-propyl)-tetrahydronororipavine

N-cyano - 6,14 - endoetheno-7-(2-hydroxy-2-propyl)-tetrahydronorthebaine (as prepared in Example 1) (100 parts) was added to potassium hydroxide (250 parts) in diethylene glycol (1200 parts) at 180 to 190° C. and the mixture was stirred at 210 to 220° C. for 30 minutes and then poured into ice-water. The aqueous solution so obtained was saturated with ammonium chloride and the precipitated phenolic base was collected and washed well with water. The crude material (80 parts) had M.P. 280 to 282° C., raised to 284° C. by recrystallization from methanol. A further quantity (7 parts) of the base was obtained by extraction of the aqueous filtrate with chloroform.

Hydrolysis conditions intermediate in vigour (alkali content and temperature) between those given above and those used in Example 1 gave a mixture of the phenol and its methyl ether; the latter was precipitated when the reaction mixture was poured into ice-water and could be removed by filtration; subsequent saturation of the filtrate with ammonium chloride liberated the phenol, which could be collected or extracted with chloroform.

(b) 6,14 - endoetheno - 7 - (2-hydroxy - 2 - propyl)-tetrahydronorthebaine (29 parts) was demethylated by heating for 30 minutes with stirring at 210° C. in a solution of potassium hydroxide (90 parts) and diethylene glycol (500 parts) preheated to that temperature. The product, M.P. 284° C. (20 parts), was isolated as in Example 2(a). The hydrochloride, prepared in ethanolic hydrogen chloride, and recrystallised from ethanol, had M.P. 208° C. (dec.).

Example 3.—N-allyl-6,14-endoetheno-7-(2-hydroxy-2-propyl)-tetrahydronorthebaine (a) 6,14-endoetheno-7-(2-hydroxy-2 - propyl)tetrahydronorthebaine (3.4 parts), allyl bromide (1 part) and sodium carbonate (2 parts) in ethanol were boiled under reflux for 24 hours. The mixture was filtered and evaporated, leaving a viscous gum that crystallized on standing. On recrystallisation from light petroleum (B.P. 40 to 60° C.) it was obtained as prisms, M.P. 104° C.

(b) 6,14-endoetheno-7-acetyltetrahydrothebaine (25 parts) and cyanogen bromide (8 parts) in chloroform (75 parts) were kept at room temperature overnight. The chloroform was evaporated and the residue was triturated with methanol. The resulting crystalline N-cyano-6,14-endoetheno-7-acetyltetrahydronorthebaine (23 parts), M.P. 236° C. was collected.

The N-cyano-compound so obtained (10 parts) was finely powdered and boiled with 2 N hydrochloric acid (100 parts) until almost all of the solid matter had dissolved (about 2 hours). The almost insoluble N-cyano-compound was wetted by the aqueous acid only with difficulty and at first frothing was troublesome; this was minimised by adding a few drops of a neutral wetting agent such as "Stergene." The hot mixture was filtered from a small amount of insoluble matter, and cooled at 0° C. An aqueous solution of sodium nitrite (2 parts) was then added with stirring to the mixture containing the substituted urea resulting from partial hydrolysis of the N-cyano-compound. When gas evolution ceased the reaction mixture was made alkaline with ammonia solution and the base was extracted with chloroform; evaporation of the solvent afforded 6,14-endoetheno-7-acetyltetrahydronorthebaine (6 parts) as a hard glass. The base gave a crystalline hydrochloride, M.P. 350° C. recrystallizable from hot water, when treated with aqueous hydrochloric acid or menthanolic hydrogen chloride. The picrate had M.P. 270° C. (dec.).

6,14-endoetheno-7-acetyltetrahydronorthebaine thus obtained (20 parts) was boiled with allyl bromide (6 parts) in ethanol (100 parts) in the presence of anhydrous sodium carbonate (10 parts) for 20 hours. The mixture was cooled and filtered and the filtrate was evaporated leaving N-allyl-6,14-endoetheno-7-acetyltetrahydronorthebaine as an uncrystallizable glass, that gave a hydrochloride which crystallized as plates from ethanol, M.P. 233° C. (14 parts).

A solution of N-allyl-6,14-endoetheno-7-acetyltetrahydronorthebaine base so obtained (13 parts) in ether (50 parts) was added to a boiling stirred solution of methylmagnesium iodide prepared from magnesium (3.8 parts) methyl iodide (22.5 parts) and ether (100 parts). The mixture was stirred and heated under reflux for two hours and then poured into a saturated aqueous solution of ammonium chloride. The ethereal layer was separated, dried and evaporated, leaving a viscous residue that crystallized on standing. On recrystallization from light petroleum (B.P. 40 to 60° C.) it was obtained as prisms, M.P. 104° C.

Example 4.—N-allyl-6,14-endoetheno-7-(2-hydroxy-2-propyl)tetrahydronororipavine (a) 6,14-endoetheno-7-(2-hydroxy-2-propyl)tetrahydronororipavine (from Example 2) (3.4 parts) was boiled in ethanol (80 parts) with allyl bromide (1 part) and anhydrous sodium carbonate (2 parts) for 20 hours. The mixture was cooled and filtered and the filtrate was evaporated. Treatment of the residue with methanol gave the N-allyl base (1.5 parts) which on recrystallization from methanol was obtained as prisms, M.P. 120° C. on slow heating, 210° C. if inserted in a melting point bath at 200° C. The hydrochloride prepared in and recrystallized from ethanol, had M.P. 248° C. (dec.).

The 3-acetyl ester was prepared by treating the base (1 part) in acetic anhydride (1 part) under reflux for 10 minutes. The mixture was poured into water, the base was liberated with aqueous sodium carbonate and isolated by ether extraction. This ester was an oil which gave a crystalline hydrochloride, M.P. 236° C.

(b) N-allyl-6,14-endoetheno-7-(2-hydroxy-2-propyl)-tetrahydronorthebaine was demethylated by heating it with potassium hydroxide (40 parts) and diethylene (150 parts) at 200° C. until a text portion gave a homogeneous solution when diluted with 10 parts of water. The mixture was then poured into 8 times its volume of water and the phenolic base was precipitated by adding saturated aqueous ammonium chloride. The precipitate was extracted with ether and the ethereal solution was dried and evaporated leaving the solid base which was recrystallized from methanol, when it was obtained as prisms M.P. 120° C. on slow heating, 210° C. if inserted into a melting point bath at 200° C., both melting points were undepressed on mixing with material prepared as in Example 4(a).

Example 5.—N-cyclopropylmethyl-6,14-endoetheno-7-(2-hydroxy-2-propyl)-tetrahydronorthebaine 6,14-endoetheno-7-(2-hydroxy-2-propyl)-tetrahydronorthebaine (5 parts) was stirred in dry ether with anhydrous potassium carbonate (5 parts) and cyclopropylcarbonyl chloride (1.4 parts) was added. After 6 hours water and dilute hydrochloric acid were added and the ethereal layer was separated. On drying and evaporation this afforded the nonbasic amide N-cyclopropylcarbonyl-6,14-endoetheno-7-(2-hydroxy-2-propyl)-tetrahydronorthebaine as prisms M.P. 214° C. when recrystallized from methanol. This amide (2 parts) was dissolved in tetrahydrofuran (20 parts) and reduced under reflux for 5 hours with lithium aluminum hydride. Water (8 parts) was then added. The mixture was filtered and the residue was washed with ether. The combined washings and filtrate were shaken with dilute hydrochloric acid. The aqueous acid solution was made alkaline with ammonia, and the precipitate base isolated by ether extraction when N-cyclopropylmethyl-6,14-endoetheno-7-(2-hydroxy-2-propyl)-tetrahydronorthebaine was obtained as a viscous gum that formed a crystalline hydrochloride M.P. 266° C.

Example 6.—N-cyclopropylmethyl-6,14-endoetheno-7-(2-hydroxy-2-propyl)-tetrahydronororipavine This was prepared as in Example 5 from (a) 6,14-endoetheno-7-(2-hydroxy-2-propyl)-tetrahydronororipavine (5 parts) and cyclopropylcarbonyl chloride (2.4 parts); (b) lithium aluminium hydride (2.15 parts) and tetrahydrofuran (100 parts). The intermediate amide had M.P. 290° C. and the final base M.P. 234° C.

Example 7.—N-propargyl-6,14-endoetheno-7-(2-hydroxy-2-propyl)-tetrahydronorthebaine This base was prepared by the method of Example 3(a) from 6,14-endoetheno-7-(2-hydroxy-2-propyl)-tetrahydronorthebaine (5 parts), propargyl bromide (1.2 parts) and anhydrous sodium carbonate (5 parts) in ethanol. The mixture was filtered and the base precipitated with water. On recrystallisation from aqueous ethanol it had M.P. 163° C.

Example 8.—N-n-propyl-6,14-endoetheno-7-(2-hydroxy-2-propyl)-tetrahydronorthebaine This base was prepared from 6,14-endoetheno-7-(2-hydroxy-2-propyl)tetrahydronorthebaine (5 parts), n-propyl iodide (5 parts) and anhydrous sodium carbonate (5 parts) by the method of Example 3(a), on recrystallisation from ethanol it was obtained as colourless needles, M.P. 157° C., hydrochloride M.P. 286° C. (dec.).

Example 9.—N-isobutyl-6,14-endoetheno-7-(2-hydroxy-2-propyl)tetrahydronorthebaine This base was prepared from 6,14-endoetheno-7-(2-hydroxy-2-propyl)-tetrahydronorthebaine (5 parts), isobutyl bromide (2 parts) and anhydrous sodium carbonate (5 parts). Recrystallisation from ethanol gave prisms, M.P. 76° C.; hydrochloride M.P. 294° C.

Example 10.—N-2-methylallyl-6,14-endoetheno-7-(2-hydroxy-2-propyl)-tetrahydronorthebaine This base was prepared as in Example 3(a) from 6,14-endoetheno-7-(2-hydroxy-2-propyl)-tetrahydronorthebaine (5 parts) 2-methylallyl bromide (1.5 parts) and anhydrous sodium carbonate (5 parts); the base so obtained was non-crystalline but formed a crystalline hydrochloride, M.P. 248° C.

Example 11.—N-dimethylallyl-6,14-endoetheno-7-(2-hydroxy-2-propyl)-tetrahydronorthebaine This base was prepared as in Example 3(a) from 6,14-endoetheno-7-(2 - hydroxy - 2 - propyl)-tetrahydronorthebaine (5 parts), 3,3-dimethylallyl bromide (1.5 parts) and anhydrous sodium carbonate (5 parts) but using acetone as a solvent. It was obtained as prisms, M.P. 110° C.; hydrochloride M.P. 172° C.

Example 12.—N-propargyl-6,14-endoetheno-7-(2-hydroxy-2-propyl)-tetrahydronororipavine This base was prepared as in Example 4(a) from 6,14-endoetheno-7-(2 - hydroxy - 2 - propyl)-tetrahydronororipavine (5 parts), propargyl bromide (1.5 parts) and anhydrous sodium carbonate (5 parts), and so obtained it had M.P. 120° C.; hydrochloride, M.P. 240° C.

Example 13.—N-dimethylallyl-6,14-endoetheno-7-(2-hydroxy-2-propyl)-tetrahydronororipavine This base was prepared as in Example 4(a) from 6,14-endoetheno-7-(2 - hydroxy - 2 - propyl)-tetrahydronororipavine (5 parts), 3,3-dimethylallyl bromide (1.5 parts) and anhydrous sodium carbonate (5 parts) but using acetone as solvent. In this way it was obtained as a non-crystalline gum but formed a crystalline hydrochloride, M.P. 212° C.

Example 14.—6,14-endoetheno-7-hydroxymethyltetrahydronororipavine

This base was prepared as in Examples 1 and 2 from 6,14 - endoetheno-7-hydroxymethyltetrahydronorthebaine and cyanogen bromide, followed by hydrolysis at 210° C. The intermediate N-cyano-compound had M.P. 190° C. and the secondary base was non-crystalline, but gave a crystalline hydrochloride, M.P. 264° C.

Example 15.—N-allyl-6,14-endoetheno-7-hydroxymethyl-tetrahydronororipavine

This base was prepared as in Example 4(a) from 6,14-endoetheno - 7 - hydroxymethyltetrahydronororipavine (5 parts), allyl bromide (1.5 parts) and anhydrous sodium carbonate (5 parts); it was non-crystalline, but gave a crystalline hydrochloride, M.P. 281° C.

Example 16.—6,14-endoetheno-7α-(2-hydroxy-2-butyl)-tetrahydronorthebaine

This was prepared as in Example 1 from 6,14-endoetheno-7α-(2-hydroxy-2-butyl) - tetrahydronorthebaine, cyanogen bromide and chloroform, followed by hydrolysis at 170° C. The intermediate N-cyano-compound had M.P. 198° C. and the secondary base had M.P. 96° C.

Example 17.—N-allyl-6,14-endoetheno-7α-(2-hydroxy-2-butyl)-tetrahydronorthebaine This base was prepared as in Example 3(a) from 6,14-endoetheno - 7α - (2-hydroxy-2-butyl)-tetrahydronorthebaine (5 parts), allyl bromide (1.5 parts) and anhydrous sodium carbonate (5 parts). The base was non-crystalline, but gave a crystalline hydrochloride M.P. 286° C.

Example 18.—N-n-propyl-6,14-endoetheno-7α-(2-hydroxy-2-butyl)-tetrahydronorthebaine The base was prepared as in Example 3(a) from 6,14-endoetheno - 7α - (2-hydroxy-2-butyl)-tetrahydronorthebaine (5 parts), n-propyl bromide (1.5 parts) and anhydrous sodium carbonate (5 parts), it had M.P. 142° C.

Example 19.—N-propargyl-6,14-endoetheno-7α-(2-hydroxy-2-butyl)-tetrahydronorthebaine The base was prepared as in Example 3(a) from 6,14-endoetheno - 7α - (2-hydroxy-2-butyl)-tetrahydronorthebaine (5 parts), propargyl bromide (1.5 parts) and anhydrous sodium carbonate (5 parts); it was obtained as colourless prisms M.P. 158° C.; hydrochloride M.P. 293° C.

Example 20.—N-isobutyl-6,14-endoetheno-7α-(2-hydroxy-2-butyl)-tetrahydronorthebaine The base was prepared as in Example 3(a) from 6,14-endoetheno - 7α - (2-hydroxy-2-butyl)-tetrahydronorthebaine (5 parts), isobutyl bromide (1.5 parts) and anhydrous sodium carbonate (5 parts); it was an uncrystallizable gum, from which a crystalline hydrochloride, M.P. 268° C. was obtained.

Example 21.—N-2-methylallyl-6,14-endoetheno-7α-(2-hydroxy-2-butyl-tetrahydronorthebaine This base was prepared as in Example 3(a) from 6,14 - endoetheno - 7α - (2 - hydroxy - 2 - butyl) - tetrahydronorthebaine (5 parts), 2-methylallyl bromide (1.5 parts) and anhydrous sodium carbonate (5 parts) and was obtained as prisms, M.P. 124° C.; crystalline hydrochloride M.P. 277° C.

Example 22.—N-3-methylallyl-6,14-endoetheno-7α-(2-hydroxy-2-butyl)-tetrahydronorthebaine This base was prepared by the method of Example 3(a) from 6,14-endoetheno-7α-(2-hydroxy-2-butyl)-tetrahydronorthebaine (5 parts), crotyl chloride (1.3 parts) and anhydrous sodium carbonate (5 parts), and was obtained as a viscous uncrystallizable gum, giving a bitartrate, M.P. 242° C.

Example 23.—N-Dimethylallyl-6,14-endoetheno-7α-(2-hydroxy-2-butyl)-tetrahydronorthebaine This base was prepared by the general method of Example 3(a) from 6,14-endoetheno-7α-(2-hydroxy-2-butyl)-tetrahydronorthebaine (5 parts) 3,3-dimethylallyl bromide (1.5 parts) and anhydrous sodium carbonate (5 parts) but using acetone as solvent. In this way it was obtained as an uncrystallizable gum giving a hydrochloride M.P. 210° C.

Example 24.—6,14-endoetheno-7α-(2-hydroxy-2-pentyl)-tetrahydronorthebaine

This base was prepared as in Example 1 from 6,14-endoetheno - 7α - (2 - hydroxy - 2 - pentyl) - tetrahydronorthebaine and cyanogen bromide, followed by hydrolysis at 170° C. The intermediate N-cyano-compound had M.P. 200° C. and the secondary base had M.P. 173° C., hydrochloride M.P. 260° C.

Example 25.—6,14-endoetheno-7β-(2-hydroxy-2-pentyl)-tetrahydronorthebaine

This base was prepared in Example 1 from 6,14-endoetheno - 7β - (2 - hydroxy - 2 - pentyl)-tetrahydronorthebaine and cyanogen bromide, followed by hydrolysis at 170° C. The intermediate N-cyano-compound had M.P. 208° C. and the secondary base had M.P. 102° C.

Example 26.—N-allyl-6,14-endoetheno-7α-(2-hydroxy-2-pentyl)-tetrahydronorthebaine This base was prepared as in Example 3(a) from 6,14 - endotheno - 7α - (2 - hydroxy - 2 - pentyl) - tetrahydronorthebaine (5 parts), allyl bromide (1.5 parts) and anhydrous sodium carbonate (5 parts). The base was dimorphic, being obtained from benzene as needles M.P. 80° C. and from ethanol or methanol as needles M.P. 118° C.; the hydrochloride had M.P. 163° C.

Example 27.—N-allyl-6,14-endoethano-7β-(2-hydroxy-2-pentyl)-tetrahydronorthebaine This base was prepared as in Example 3(a) from 6,14 - endoetheno - 7β - (2 - hydroxy - 2 - pentyl) - tetrahydronorthebaine (5 parts), allyl bromide (1.5 parts) and anhydrous sodium carbonate (5 parts); it was non-crystalline but gave a crystalline hydrochloride M.P. 277° C. It was also prepared as in Example 3(b) from N - allyl - 6,14 - endoetheno - 7 - acetyltetrahydronorthebaine (13 parts), magnesium (3.8 parts) and n-propyl iodide (23 parts); in this case the α-isomer was obtained from the mother liquors of crystallization of the β-hydrochloride.

Example 28.—N-n-propyl-6,14-endoetheno-7α-(2-hydroxy-2-pentyl)-tetrahydronorthebaine The base was prepared as in Example 3(a) from 6,14-endoetheno - 7α - (2 - hydroxy - 2 - pentyl) - tetrahydronorthebaine (5 parts), n-propyliodide (2 parts) and anhydrous sodium carbonate (5 parts); the base was obtained as an uncrystallizable gum giving a crystalline bitartrate, M.P. 254° C.

Example 29.—N-n-propyl-6,14-endoetheno-7β-(2-hydroxy-2-pentyl)-tetrahydronorthebaine This base was prepared as in Example 3(a) from 6,14-endoetheno - 7β - (2 - hydroxy - 2 - pentyl) - tetrahydronorthebaine (5 parts), n-propyl iodide (2 parts) and anhydrous sodium carbonate (5 parts) as an uncrystallizable gum giving a crystalline hydrochloride, M.P. 315° C.

Example 30.—N-isobutyl-6,14-endoetheno-7α-(2-hydroxy-2-pentyl)-tetrahydronorthebaine This base was prepared as in Example 3(a) from 6,14-endoetheno - 7α - (2 - hydroxy - 2 - pentyl) - tetrahydronorthebaine (5 parts), isobutyl bromide (1.5 parts) and anhydrous sodium carbonate (5 parts as prisms, M.P. 174° C.

Example 31.—N-isobutyl-6,14-endoetheno-7β-(2-hydroxy-2-pentyl)-tetrahydronorthebaine This base was prepared as in Example 3(a) from 6,14-endoetheno - 7β - (2 - hydroxy - 2 - pentyl) - tetrahydronorthebaine, propargyl bromide and anhydrous sodium carbonate as an uncrystallizable gum giving a crystalline hydrochloride, M.P. 300° C.

Example 32.—N-propargyl-6,14-endoetheno-7α-(2-hydroxy-2-pentyl)-tetrahydronorthebaine This base was prepared as in Example 3(a) from 6,14-endoetheno - 7β - (2 - hydroxy - 2 - pentyl) - tetrahydronorthebaine, propargyl bromide and anhydrous sodium carbonate as prisms, M.P. 162° C.

Example 33.—N-propargyl-6,14-endoetheno-7β-(2-hydroxy-2-pentyl)-tetrahydronorthebaine This base was prepared as in Example 3(a) from 6,14-endoetheno - 7α - (2 - hydroxy - 2 - pentyl) - tetrahydronorthebaine, propargyl bromide and sodium carbonate as an uncrystallizable gum, hydrochloride M.P. 260° C.

Example 34.—N-methylallyl-6,14-endoetheno-7α-(2-hydroxy-2-pentyl)-tetrahydronorthebaine This base was prepared as in Example 3(a) from 6,14-endoetheno - 7α - (2 - hydroxy - 2 - pentyl) - tetrahydronorthebaine, 2-methylallyl bromide and sodium carbonate as an uncrystallisable gum, hydrochloride, M.P. 277° C.

Example 35.—N-dimethylallyl-6,14-endoetheno-7α-(2-hydroxy-2-pentyl)-tetrahydronorthebaine This base was prepared as in Example 3(a) from 6,14-endoetheno - 7α - (2 - hydroxy - 2 - pentyl) - tetrahydronorthebaine, 3,3-dimethylallyl bromide and sodium carbonate, but using acetone as a solvent; it was obtained as colourless needles M.P. 106° C.; hydrochloride M.P. 160° C.

Example 36.—N-cyclopropylmethyl6,14-endoetheno-7α-(2-hydroxy-2-pentyl)-tetrahydronorthebaine This base was prepared as in Example 5 from 6,14-endoetheno - 7α - (2-hydroxy-2-pentyl)-tetrahydronorthebaine and the acid chloride of cyclopropylcarboxylic acid, followed by reduction with lithium aluminum hydride. The intermediate amide had M.P. 185° C. and the tertiary base had M.P. 130° C.

Example 37.—6,14-endoetheno-7α-(2-hydroxy-2-pentyl)-tetrahydronororipavine

This base was prepared as in Examples 1 and 2(a) from 6,14 - endoetheno-7α-(2-hydroxy-2-pentyl)-tetrahydronorthebaine, cyanogen bromide and chloroform, followed by hydrolysis at 210° C. So obtained it had M.P. 260° C. hydrochloride M.P. 305° C. It was also prepared as in Example 2(b) from 6,14-endoetheno-7α-(2-hydroxy-2-pentyl)-tetrahydronorthebaine by demethylation at 210° C.

Example 38.—N-allyl-6,14-endoetheno-7α-(2-hydroxy-2-pentyl)-tetrahydronororipavine This base was prepared as in Example 4(a) from 6,14-endoetheno - 7α - (2-hydroxy-2-pentyl)-tetrahydronororipavine, allyl bromide and anhydrous sodium carbonate; it had M.P. 126° C.; hydrochloride M.P. 254° C.

Example 39.—N-dimethylallyl-6,14-endoetheno-7α-(2-hydroxy-2-pentyl)-tetrahydronororipavine This base was prepared as in Example 4(a) from 6,14-endoetheno - 7α - (2-hydroxy-2-pentyl)-tetrahydronororipavine, 3,3-dimethylallyl bromide and anhydrous sodium carbonate, using acetone as solvent; it was obtained as prisms, M.P. 190° C.

Example 40.—N-cyclopropylmethyl-6,14-endoetheno-7α-(2-hydroxy-2-pentyl)-tetrahydronororipavine This base was prepared as in Example 5 from 6,14-endoetheno - 7α - (2-hydroxy-2-pentyl)-tetrahydronororipavine, and cyclopropylcarbonyl chloride followed by reduction with lithium aluminum hydride. The intermediate amide had M.P. 270° C. and the tertiary base had M.P. 180° C.; hydrochloride M.P. 262° C.

Example 41.—6,14-endoetheno-7α-(2-hydroxy-2-hexyl)-tetrahydronorthebaine

This base was prepared as in Example 1 from 6,14-endoetheno - 7α - (2-hydroxy-2-hexyl)-tetrahydronorthebaine, cyanogen bromide and chloroform, followed by hydrolysis at 170° C. So obtained it formed prisms, M.P. 110° C.

Example 42.—N-allyl-6,14-endoetheno-7α-(2-hydroxy-2-hexyl)-tetrahydronorthebaine This base was prepared as in Example 3(a) from 6,14-endoetheno - 7α - (2-hydroxy-2-hexyl)-tetrahydronorthebaine, allyl bromide and sodium carbonate, it had M.P. 102° C.

Example 43.—N-propargyl-6,14-endoetheno-7α-(2-hydroxy-2-hexyl)-tetrahydronorthebaine This base was prepared as in Example 3(a) from 6,14-endoetheno - 7α - (2-hydroxy-2-hexyl)-tetrahydronorthebaine, propargyl bromide and sodium carbonate; it had M.P. 152° C.

Example 44.—6,14-endoetheno-7α-(2-hydroxy-2-hexyl)-tetrahydronororipavine

This base was prepared from 6,14-endoetheno-7α-(2-hydroxy-2-hexyl)-tetrahydronorthebaine by treatment with cyanogen bromide and subsequent hydrolysis at 210° C. as in Examples 1 and 2(a). So obtained it had M.P. 210° C.

Example 45.—N-allyl-6,14-endoetheno-7α-(2-hydroxy-2-hexyl)-tetrahydronororipavine This was prepared as in Example 4(a) from 6,14-endoetheno - 7α - (2-hydroxy-2-hexyl)-tetrahydronororipavine, allyl bromide and sodium carbonate and was obtained as prisms, M.P. 122° C.; hydrochloride M.P. 263° C.

Example 46.—6,14-endoetheno-7α-(2-hydroxy-4-methyl-2-pentyl)-tetrahydronorthebaine This was prepared as in Example 1 from 6,14-endoetheno - 7α-(2-hydroxy-4-methyl-2-pentyl)-tetrahydronorthebaine and cyanogen bromide, followed by hydrolysis at 170° C. The intermediate N-cyano compound had M.P. 170° C. and the secondary base had M.P. 131° C.

Example 47.—N-allyl-6,14-endoetheno-7α-(2-hydroxy-4-methyl-2-pentyl)-tetrahydronorthebaine This base was prepared as in Example 3(a) from 6,14-endoetheno-7α-(2-hydroxy-4-methyl-2-pentyl)-tetrahydronorthebaine, allyl bromide and anhydrous sodium carbonate, it had M.P. 102° C.

Example 48.—6,14-endoetheno-7β-(2-hydroxy-4-methyl-2-pentyl)-tetrahydronorthebaine This base was prepared as in Example 3(a) from 6,14-endoetheno-7β-(2-hydroxy-4-methyl-2-pentyl)-tetrahydronorthebaine. The intermediate N-cyano-compound had M.P. 210° C. and the secondary base had M.P. 110° C.

Example 49.—N-dimethylallyl-6,14-endoetheno-7β-(2-hydroxy-4-methyl-2-pentyl)-tetrahydronorthebaine This base was prepared as in Example 3(a) from 6,14-endoetheno-7β-(2-hydroxy-4-methyl-2-pentyl)-tetrahydronorthebaine, 3,3-dimethylallylbromide and sodium carbonate using acetone as solvent, it was obtained as prisms, M.P. 115° C.; hydrochloride M.P. 230° C.

Example 50.—6,14-endoetheno-7α-(2-hydroxy-2-heptyl)-tetrahydronorthebaine

This base was prepared as in Example 1 from 6,14-endoetheno - 7α-(2-hydroxy-2-heptyl)-tetrahydronorthebaine, cyanogen bromide and chloroform, followed by hydrolysis at 170° C., so obtained it had M.P. 135° C. the intermediate N-cyano compound having M.P. 129° C.

Example 51.—N-methylallyl-6,14-endoetheno-7α-(2-hydroxy-2-heptyl)-tetrahydronorthebaine This was prepared as in Example 3(a) from 6,14-endotheno - 7α - (2-hydroxy-2-heptyl)-tetrahydronorthebaine, 2-methylallyl bromide and sodium carbonate, and obtained in this way it had M.P. 100° C.

Example 52.—N-dimethylallyl-6,14-endoetheno-7α-(2-hydroxy-2-heptyl)-tetrahydronorthebaine This was prepared as in Example 3(a) from 6,14-endoetheno - 7α - (2-hydroxy-2-heptyl)-tetrahydronorthebaine, 3,3-dimethylallyl bromide and sodium carbonate, using acetone as solvent and was obtained as an uncrystallizable gum from which a crystalline hydrochloride, M.P. 230° C., was obtained.

Example 53.—N-1-methylcyclopropylmethyl-6,14-endoetheno-7α-(2-hydroxy-2-heptyl)-tetrahydronorthebaine This base was prepared as in Example 5 from 6,14-endoetheno - 7α - (2-hydroxy-2-heptyl)-tetrahydronorthebaine and 1-methylcyclopropylcarbonyl chloride, followed by reduction with lithium aluminum hydride. The intermediate amide was noncrystalline and the tertiary base had M.P. 118° C.

Example 54.—6,14-endoetheno-7α-(2-hydroxy-5-methyl-2-hexyl)-tetrahydronorthebaine This was prepared by the method of Example 1 from 6,14 - endoetheno-7α-(2-hydroxy-5-methyl-2-hexyl)-tetrahydronorthebaine and cyanogen bromide followed by hydrolysis at 170° C. The intermediate N-cyano compound had M.P. 164° C. and the secondary base M.P. 134° C.

Example 55.—N-allyl-6,14-endoetheno-7α-(2-hydroxy-5-methyl-2-hexyl)-tetrahydronorthebaine This was prepared by the method of Example 3(a) from 6,14-endoetheno-7α-(2-hydroxy-5-methyl-2-hexyl)-tetrahydronorthebaine, allyl bromide and sodium carbonate and was obtained as colourless prisms, M.P. 118° C.

Example 56.—N-propargyl-6,14-endoetheno-7α-(2-hydroxy-5-methyl-2-hexyl)-tetrahydronorthebaine This was prepared by the method of Example 3(a) from 6,14-endoetheno-7α-(2-hydroxy-5-methyl-2-hexyl)-tetrahydronorthebaine, propargyl bromide and sodium carbonate and was obtained as prisms, M.P. 128° C.; hydrochloride M.P. 340° C.

Example 57.—N-n-propyl-6,14-endoetheno-7α-(2-hydroxy-5-methyl-2-hexyl)-tetrahydronorthebaine This was prepared by the method of Example 3(a) from 6,14-endoetheno-7α-(2-hydroxy-5-methyl-2-hexyl)-tetrahydronorthebaine, n-propyl iodide and sodium carbonate and was obtained as prisms, M.P. 90° C.; hydrochloride M.P. 220° C.

Example 58.—N-isobutyl-6,14-endoetheno-7α-(2-hydroxy-5-metnyl-2-hexyl)-tetrahydronorthebaine This was prepared by the method of Example 3(a) from 6,14-endoetheno-7α-(2-hydroxy-5-methyl-2-hexyl)-tetrahydronorthebaine, isobutyl bromide and sodium carbonate and was obtained as prisms, M.P. 72° C.; hydrochloride, M.P. 301° C.

Example 59.—N-methylallyl-6,14-endoetheno-7α-(2-hydroxy-5-methyl-2-hexyl)-tetrahydronorthebaine This was prepared by the method of Example 3(a) from 6,14-endoetheno-7α-(2-hydroxy-5-methyl-2-hexyl)-tetrahydronorthebaine, 2-methylallyl bromide and sodium carbonate, it formed prisms, M.P. 105° C.

Example 60.—6,14-endoetheno-7α-(2-hydroxy-5-methyl-2-hexyl)-tetrahydronororipavine This was prepared by the method of Example 2(b) from 6,14-endoetheno-7α-(2-hydroxy-5-methyl-2-hexyl)-tetrahydronorthebaine, potassium hydroxide and diethylene glycol at 210° C. So obtained the phenolic base had M.P. 262° C.

Example 61.—N-dimethylallyl-6,14-endoetheno-7α-(2-hydroxy-5-methyl-2-hexyl)-tetrahydronororipavine This was prepared by the method of Example 3(a) from 6,14-endoetheno-7α-(2-hydroxy-5-methyl-2-hexyl)-tetrahydronororipavine, 3,3-dimethylallyl bromide and sodium carbonate using acetone as solvent and was obtained as colourless prisms, M.P. 218° C.

The 3-acetyl ester was obtained by heating the phenolic base under reflux with acetic anhydride and anhydrous sodium acetate for 2 hours; isolated in the usual way this base was obtained as colourless prisms, M.P. 152° C.

Example 62.—N-cyclopropylmethyl-6,14-endoetheno-7α-(2-hydroxy-5-methyl-2-hexyl)-tetrahydronororipavine This was prepared by the method of Example 5 from 6,14-endoetheno-7α-(2-hydroxy-5-methyl-2-hexyl)-tetrahydronororipavine and cyclopropylcarbonyl chloride followed by reduction with lithium aluminum hydride. Obtained in this way the base had M.P. 176° C.

Example 63.—6,14-endoetheno-7α-(2-hydroxy-2-decyl)-tetrahydronorthebaine

This was prepared by the method of Example 1 from 6,14-endoetheno-7α-(2-hydroxy-2-decyl)-tetrahydronorthebaine and cyanogen bromide followed by hydrolysis at 170° C. The intermediate N-cyano compound had M.P. 108° C. and the secondary base could not be crystallized.

Example 64.—N-dimethylallyl-6,14-endoetheno-7α-(2-hydroxy-2-decyl)-tetrahydronorthebaine This was prepared by the method of Example 3(a) from 6,14-endoetheno-7α-(2-hydroxy-2-decyl)-tetrahydronorthebaine, 3,3-dimethylallyl bromide and sodium carbonate using acetone as solvent; obtained in this way the base formed prisms, M.P. 96° C.

Example 65.—6,14-endoetheno-7α-(1-hydroxy-1-cyclopentyl-1-ethyl)-tetrahydronorthebaine This was prepared by the method of Example 1 from 6,14 - endoetheno - 7α-(1-hydroxyl-1-cyclopentyl-1-ethyl)-tetrahydronorthebaine and cyanogen bromide followed by hydrolysis at 170° C.; obtained in this way the intermediate N-cyano-compound had M.P. 210° C. and the secondary base had M.P. 110° C.

Example 66.—N-dimethylallyl-6,14-endoetheno-7α-(1-hydroxy-1-cyclopentyl-1-ethyl)-tetrahydronorthebaine This was prepared by the method of Example 3(a) from 6,14-endoetheno-7α-(1-hydroxyl-cyclopentyl-1-ethyl)-tetrahydronorthebaine, 3,3-dimethylallyl bromide and sodium carbonate using acetone as solvent, and in this way was obtained as prisms, M.P. 112° C.

Example 67.—6,14-endoetheno-7α-(1-hydroxy-1-cyclohexyl-1-ethyl)-tetrahydronorthebaine This was prepared by the method of Example 1 from 6,14-endoetheno - 7α - (1-hydroxyl-1-cyclohexyl-1-ethyl)-tetrahydrothebaine, and cyanogen bromide, followed by hydrolysis at 170° C. The intermediate N-cyano compound had M.P. 213° C. and the secondary base had M.P. 203° C.

Example 68.—N-allyl-6,14-endoetheno-7α-(1-hydroxy-1-cyclohexyl-1-ethyl)-tetrahydronorthebaine This base was prepared by the method of Example 3(a) from 6,14 - endoetheno - 7α - (1-hydroxy - 1 - cyclohexyl-1-ethyl)-tetrahydronorthebaine, allyl bromide and sodium carbonate, and was obtained as colorless prisms, M.P. 204° C.

Example 69.—N-n-propyl-6,14-endoetheno-7α-(1-hydroxy-1-cyclohexyl-1-ethyl)-tetrahydronorthebaine When prepared as in Example 3(a) from 6,14-endoetheno - 7α - (1 - hydroxy - 1 - cyclohexyl - 1 - ethyl)-tetrahydronorthebaine, n-propyl iodide and sodium carbonate this was obtained as prisms, M.P. 180° C.

Example 70.—N-methylallyl-6,14-endoetheno-7α-(1-hydroxy-1-cyclohexyl-1-ethyl)-tetrahydronorthebaine When prepared as in Example 3(a) from 6,14-endoetheno - 7α - (1 - hydroxy - 1 - cyclohexyl - 1 - ethyl)-tetrahydronorthebaine, 2-methylallyl bromide and sodium carbonate this base was obtained as crystals, M.P. 203° C.

Example 71.—N-dimethylallyl-6,14-endoetheno-7α-(1-hydroxy-1-cyclohexyl-1-ethyl)-tetrahydronorthebaine When prepared as in Example 3(a) from 6,14-endoetheno - 7α - (1 - hydroxy - 1 - cyclohexyl - 1 - ethyl)-tetrahydronorthebaine, 3,3-dimethylallyl bromide and sodium carbonate, using acetone as solvent, this base was obtained as prisms, M.P. 190° C.

Example 72.—N-propargyl-6,14-endoetheno-7α-(1-hydroxy-1-cyclohexyl-1-ethyl)-tetrahydronorthebaine When prepared as in Example 3(a) from 6,14-endoetheno - 7α - (1 - hydroxy - 1 - cyclohexyl - 1 - ethyl)-tetrahydronorthebaine, propargyl bromide and sodium carbonate, this was obtained as prisms, M.P. 172° C.

Example 73.—N - cyclopropylmethyl-6,14-endoetheno-7α-(1-hydroxy-1-cyclohexyl-1-ethyl)-tetrahydronorthebaine The base was prepared as in Example 5 from 6,14-endoetheno - 7α - (1 - hydroxy - 1 - cyclohexyl - 1 - ethyl)-tetrahydronorthebaine and cyclopropylcarbonyl chloride, followed by reduction with lithium aluminum hydride, and was obtained as prisms, M.P. 228° C.; the intermediate amide had M.P. 220° C.

Example 74.—N - methylcyclopropylmethyl - 6,14 - endoetheno - 7α - (1 - hydroxy - 1 - cyclohexyl - 1 - ethyl)-tetrahydronorthebaine This base was prepared by the general method of Example 5 from 6,14 - endoetheno - 7α - (1-hydroxy-1-cyclohexyl-1-ethyl)-tetrahydronorthebaine and 1-methylcyclopropylcarbonyl chloride, followed by reduction with lithium aluminum hydride. So obtained it formed prisms, M.P. 98° C.; the intermediate amide had M.P. 258° C.

Example 75.—6,14-endoetheno-7α-(1-hydroxy-1-cyclohexyl-1-ethyl)-tetrahydronororipavine This base was prepared as in Examples 1 and 2(a) from 6,14 - endoetheno - 7α - (1 - hydroxy - 1-cyclohexyl-1-ethyl)-tetrahydrothebaine by treatment with cyanogen bromide and hydrolysis at 210° C. and also as in the method of Example 2(b) by the demethylation of 6,14-endoetheno - 7α - (1 - hydroxy - 1 - cyclohexyl - 1 - ethyl)-tetrahydronorthebaine with potassium hydroxide and diethylene glycol at 210° C. It was obtained as prisms, M.P. 310° C. from ethanol.

Example 76.—N-allyl-6,14-endoetheno-7α-(1-hydroxy-1-cyclohexyl-1-ethyl)-tetrahydronororipavine When prepared by the method of Example 3(a) from 6,14 - endoetheno - 7α - (1 - hydroxy - 1 - cyclohexyl - 1-ethyl)-tetrahydronororipavine, allyl bromide and sodium carbonate, this base could not be crystallized but gave a crystalline hydrochloride, M.P. 251° C.

Example 77.—N-propargyl-6,14-endoetheno-7α-(1-hydroxy-1-cyclohexyl-1-ethyl)-tetrahydronororipavine When prepared by the method of Example 3(a) from 6,14 - endoetheno - 7α - (1 - hydroxy - 1 - cyclohexyl - 1-ethyl)-tetrahydronororipavine, propargyl bromide and sodium carbonate this base could not be crystallized but gave a crystalline hydrochloride, M.P. 202° C.

Example 78.—N-n-propargyl-6,14-endoetheno-7α-(1-hydroxy-1-cyclohexyl-1-ethyl)-tetrahydronororipavine This base was prepared by the general method of Example 3(a) from 6,14 - endoetheno - 7α - (1 - hydroxy-1-cyclohexyl - 1 - ethyl)-tetrahydronororipavine, n-propyl iodide and sodium carbonate; it could not be crystallized but gave a crystalline hydrochloride, M.P. 275° C.

Example 79.—N-cyclopropylmethyl-6,14-endoetheno-7α-(1 - hydroxy - 1-cyclohexyl-1-ethyl)-tetrahydronororipavine The base was prepared by the general method of Example 5 from 6,14-endoetheno-7α-(1-hydroxy-1-cyclohexyl-1 - ethyl - tetrahydronororipavine and cyclopropylcarbonyl chloride, followed by reduction with lithium aluminum hydride. The intermediate amide had M.P. 268° C. and the tertiary base was dimorphic; recovered from methanol it was obtained as needles M.P. 134° C. which slowly changed to fine prisms, M.P. 198° C. The hydrochloride had M.P. 180° C.

Example 80.—6,14-endoetheno-7α-(1-cyclohexyl-3-hydroxy-3-butyl)-tetrahydronorthebaine 6,14 - endoetheno-7α-(1-cyclohexyl-3-hydroxy-3-butyl) tetrahydronorthebaine was prepared by the general method given in Example 3(b) from 6,14-endoetheno-7-acetyl-tetrahydrothebaine and cyclohexylethylmagnesium bromide. The base was demethylated at the nitrogen atom by reaction with cyanogen bromide and hydrolysis of the N-cyano-compound with potassium hydroxide and diethylene glycol at 170° C. as described in Example 1. The base so obtained had M.P. 117° C.

Example 81.—N-allyl-6,14-endoetheno-7α-(1-cyclohexyl-3-hydroxy-3-butyl)-tetrahydronorthebaine This was prepared by the method of Example 3(a) from 6,14 - endoetheno - 7α - (1-cyclohexyl-3-hydroxy-3-butyl)-tetrahydronorthebaine, allyl bromide and sodium carbonate; it could not be crystallized but gave a crystalline hydrochloride, M.P. 289° C.

Example 82.—N-allyl-6,14-endoetheno-7α-(2-hydroxy-1-phenyl-2-propyl)-tetrahydronorthebaine This base was prepared by the general method of Example 3(b) from N-allyl-6,14-endoetheno-7-acetyltetrahydronorthebaine (100 parts), magnesium (1.68 parts) and benzyl bromide (12 parts). The α-isomer was obtained through the hydrochloride, M.P. 225° C. as an uncrystallizable gum.

Example 83.—6,14-endoetheno-7α-(3-hydroxy-1-phenyl-3-butyl)-tetrahydronorthebaine This base was prepared by the general method of Example 1 from 6,14-endoetheno-7α-(3-hydroxy-1-phenyl-3-butyl)-tetrahydrothebaine and cyanogen bromide, followed by hydrolysis at 170° C. The intermediate N-cyano-compound had M.P. 98° C. and the secondary base M.P. 138° C.

Example 84.—N-cyclopropylmethyl-6,14-endoethano-7α-(3-hydroxy-1-phenyl-3-butyl)-tetrahydronorthebaine This base was prepared by the general method of Example 5 from 6,14-endoetheno-7α-(3-hydroxy-1-phenyl-3-butyl)-tetrahydronorthebaine and cyclopropylcarbonyl chloride, followed by reduction with lithium aluminum hydride. The intermediate amide had M.P. 160° C. and the tertiary base M.P. 189° C.; hydrochloride M.P. 243° C.

Example 85.—N-allyl-6,14-endoetheno-7-(4-hydroxy-4-pent-1-enyl)-tetrahydronorthebaine This base was prepared as in Example 3(b) from N-allyl - 6,14 - endoetheno - 7 - acetyl-tetrahydronorthebaine (10 parts), magnesium (1.67 parts) and allyl bromide (8.5 parts). The α-isomer, isolated through its hydrochloride, M.P. 275° C. was an uncrystallizable gum; the β-isomer and its salts could not be crystallized.

Example 86.—N-allyl-6,14-endoetheno-6-(6-hydroxy-6-hept-1-enyl)-tetrahydronorthebaine This base was prepared as in Example 3(b) from N-allyl-6,14-endoetheno-7-acetyl-tetrahydronorthebaine (10 parts), magnesium (1.67 parts) and 1-bromopent-4-ene (9.4 parts). The two isomers were both non-crystalline, but the α-isomer gave a crystalline bitartrate, M.P. 239° C.

Example 87.—N-allyl-6,14-endoetheno-7-(1-ethoxy-4-hydroxy-4-pentyl)-tetrahydronorthebaine This base was prepared as in Example 3(b) from N-allyl-6,14-endoetheno-7-acetyltetrahydronorthebaine (10 parts), magnesium (1.67 parts) and 1-chloro-3-ethoxypropane (8.5 parts). The α-isomer had M.P. 113° C., hydrochloride M.P. 262° C.; the α-isomer failed to crystallize.

Example 88.—N-allyl-6,14-endoetheno-7-(5-hydroxy-1-phenoxy-5-hexyl)-tetrahydronorthebaine This was prepared as in Example 3(b) from N-allyl-6,14-endoetheno-7-acetyltetrahydronorthebaine (10 parts), magnesium (1.67 parts) and 1-bromo-4-phenoxybutane (16.0 parts). The α-isomer had M.P. 136° C., hydrobromide M.P. 285° C.; the β-isomer failed to crystallize.

Example 89.—N-allyl-6,14-endoetheno-7-(4-hydroxy-1-tetrahydrofuryl-4-pentyl)-tetrahydronorthebaine This base was prepared as in Example 3(b) from N-allyl-6,14-endoetheno-7-acetyltetrahydronorthebaine (10 parts), magnesium (1.67 parts) and 1-bromo-3-tetrahydrofurylpropane (13.4 parts). The α-isomer had M.P. 72° C., hydrochloride M.P. 182° C., and the β-isomer failed to crystallize.

Example 90.—6,14-endoetheno-7α-(1-hydroxy-1-p-tolyl-1-ethyl)-tetrahydronorthebaine This was prepared as in Example 1 from 6,14-endoetheno - 7α - (1 - hydroxy - 1 - p - tolyl - 1 - ethyl) - tetrahydrothebaine and cyanogen bromide, followed by hydrolysis with potassium hydroxide and diethylene glycol at 170° C. The intermediate N-cyano-compound had M.P. 210° C. and the secondary base had M.P. 190° C.

Example 91.—N-allyl-6,14-endoetheno-7α-(1-hydroxy-1-p-tolyl-1-ethyl)-tetrahydronorthebaine This base was prepared as in Example 3(a) from 6,14-endoetheno - 7α - (1 - p - tolyl - ethyl) - tetrahydronorthebaine (5 parts), allyl bromide (1.5 parts) and anhydrous sodium carbonate (5 parts); it was obtained as white prisms, M.P. 201° C.

Example 92.—N-pentyl-6,14-endoetheno-7-(2-hydroxy-2-propyl)-tetrahydronorthebaine Dimethyl azodicarboxylate (3.64 g.) was added to a solution of 6,14-endoetheno-7-(2-hydroxy-2-propyl)-tetrahydrothebaine (10 g.) in acetone (75 ml.). The solvent was evaporated on a steam bath and the residue heated for 30 minutes, and then dissolved in hot acetone (20 mls.). Water was gradually added to this solution to precipitate a solid which was filtered, washed with acetone and dried; the yield was 6 g. of N,N′-methylene-bis-6,14-endoetheno - 7 - (2 - hydroxy - 2 - propyl) - tetrahydronorthebaine, M.P. 270° C. The material was recrystallized from methanol. The bis-compound (4.0 g.) anhydrous sodium carbonate (10 g.) pentyl iodide (10 ml.) and ethanol (50 ml.) were boiled together under reflux with stirring for 68 hours, cooled and filtered.

The filtrate was evaporated, the residue was extracted with ether, the ether extracts were evaporated to dryness and the residue was recrystallized twice from aqueous methanol to give N-pentyl-6,14-endoetheno-7-(2-hydroxy-2-propyl)tetrahydronorthebaine (2.62 g.), M.P. 134.5–135.5° C. (Found: C, 74.3; H, 8.7; N, 3.0%. $C_{28}H_{39}NO_4$ requires C, 74.1; H, 8.7; N, 3.1%.)

Example 93.—6,14-endoetheno-7-(2-hydroxy-2-butyl)-tetrahydronororipavine

N-cyano-6,14-endoetheno-7-(2-hydroxy-2 - butyl)tetrahydronorthebaine (37 g.) slurried in diethylene glycol (120 ml.) was added with stirring to a mixture of potassium hydroxide (100 g.) and diethylene glycol (350 g.) previously heated to 180° C. The temperature was raised to 210–220° C. and maintained at this level for ½ hour; the reaction mixture was poured into ice-water (1 liter) with stirring. The aqueous solution was saturated with ammonium chloride. The precipitate was collected, washed and dried, and crystallized from aqueous methanol (15 g.). M.P. 275–277° C. (Found: C, 71.5; H, 7.7; N, 3.6%. $C_{23}H_{29}NO_4$ requires C, 72.0; H, 7.6; N, 3.7%.)

Example 94.—N-cyclopropylmethyl-6,14-endoetheno-7-(2-hydroxy-2-butyl)tetrahydronororipavine Cyclopropylcarbonyl chloride (0.6 g.) was added to a stirred mixture of the base from Example 93 (2.0 g.), dry ether (100 ml.) and anhydrous potassium carbonate (2.0 g.) at room temperature; stirring was continued overnight. Treatment with hydrochloric acid and collection of the precipitate gave the product (1.8 g.) which was purified by crystallization from aqueous ethanol. An analytical sample had M.P. 251–254° C. (Found: C, 71.7; H, 7.6; N, 3.2%. $C_{27}H_{33}NO_5$ requires C, 71.8; H, 7.4; N, 3.1%.) This cyclopropyl carbonyl compound (6.5 g.) in dry tetrahydrofuran (120 ml.) was added at room temperature to lithium aluminum hydride (3.5 g.) in dry tetrahydrofuran (20 ml.) and the mixture boiled under reflux with stirring for 5 hours. The product was cooled and cautiously treated with saturated aqueous potassium sodium tartrate. The tetrahydrofuran layer was separated and the aqueous layer extracted with ether after washing the combined organic solutions with water and drying over anhydrous sodium sulphate, the crude product (4 g.) was obtained by evaporation. Recrystallization from aqueous methanol gave material of M.P. 114–117° C. (Found: C, 73.4; H, 8.1; N, 3.4%. $C_{27}H_{35}NO_4$ requires C, 74.1; H, 8.1; N, 3.2%.)

Example 95.—N-cyclopropylmethyl-6,14-endoetheno-7-(2-hydroxy-2-butyl)tetrahydronorthebaine A mixture of 6,14-endoetheno-7-(2-hydroxy-2-butyl)-tetrahydrothebaine (30 g.); diethylazodicarboxylate (13.1 g.) and acetone (300 ml.) was boiled under reflux for 1¼ hours, the solvent was evaporated, and the residual gum further heated at 100° C. for 1¼ hours. The residue was dissolved in boiling methanol (150 ml.) and treated with water (75 ml.) heating was continued for a time and the precipitated compound was collected and washed with methanol. Purification with n-propanol gave 15.5 g. of M.P. 250–255° C. (Found: C, 72.1; H, 7.8; N, 3.5%. $C_{49}H_{62}N_2O_8$ requires C, 72.9; H, 7.7; N, 3.5%.) This bis-compound (4 g.) was treated in dry benzene (75 ml.) with cyclopropylcarbonyl chloride (5 g. and anhydrous potassium carbonate (8 g.); the mixture was kept overnight, filtered and the solvent evaporated. The residue was heated in aqueous acetone solution and the crude product N-cyclopropylcarbonyl-6,14-endoetheno-7-(2-hydroxy - 2-butyl)tetrahydronorthebaine (1.6 g.) was precipitated by dilution with water. Recrystallization from ethanol gave M.P. 211–212° C. (Found: C, 72.0; H, 7.6; N, 3.0%. $C_{28}H_{35}NO_5$ requires C, 72.2; H, 7.6; N, 3.0%.) This cyclopropylcarbonyl compound (2.7 g.), lithium aluminum hydride (1.35 g.) and tetrahydrofuran (30 ml.) were boiled under reflux for 5¼ hours. Excess of lithium aluminum hydride was destroyed by dropwise addition of water (1.3 ml.); the filtered solution was evaporated and the residue recrystallized from aqueous ethanol to give 1.38 g. of the title product of M.P. 109.5–112.5° C. Recrystallization from aqueous ethanol gave M.P. 112–113° C. (Found: C, 74.1; H, 8.3; N, 3.2%. $C_{28}H_{37}NO_4$ requires C, 74.5; H, 8.3; N, 3.1%.)

Example 96.—6,14-endoetheno-7-(2-hydroxy-2-but-3-enyl)tetrahydrothebaine 6,14-endoetheno-7-acetyltetrahydrothebaine (10 g.) in anhydrous tetrahydrofuran (10 ml.) was added to an agitated solution of vinyl magnesium bromide maintained at 40–50° C. and prepared from magnesium (1.6 g.) and vinyl bromide (7 g.) in anhydrous tetrahydrofuran (5 ml.). The mixture was stirred and heated at 60° C. for 30 minutes, poured into saturated aqueous ammonium chloride solution and the product was isolated by four extractions with ether. Evaporation of the combined ether extracts gave a gum, which crystallized on addition of methanol to give the α-isomer, M.P. 155° C. The hydrochloride was prepared by addition of the base to 1 N hydrochloride acid when the salt precipitated, this had M.P. 228° C. (dec.) the β-isomer was not isolated.

The thebaine and oripavine derivatives of the present invention and their non-toxic pharmaceutically acceptable salts exhibit analgesic activity through their power to affect the central nervous system. They may be administered within the known analgesic range of 10 micrograms to 50 mg. and by the same routes of administration as morphine. In addition, compounds of the present invention exhibit sedative and anti-tussive effects. The compounds of Formula I wherein:

R is hydrogen or methyl;
$R^1$ is n-propyl, allyl, methylallyl, dimethylallyl, propargyl or cyclopropylmethyl;
$R^2$ is hydrogen, methyl, ethyl or propyl; and
$R^3$ is alkyl of up to 2 carbon atoms;

also exhibit antagonism to narcotic analgesics such as morphine. It is important to note, however, that these antagonists are, together with the other compounds of the present invention, analgesics but that in addition to their analgesic properties these antagonize the effects of narcotic analgesics such as morphine.

The compounds of the present invention have exhibited analgesic activity in one or more of the following recognized analgesic tests. The test procedures used to indicate analgesia in animals were the rat-tail pressure method of H. F. Green and P. A. Young (1951) Br. J. Pharmac. Chemother 6, 572, the rat antibradykinin method of G. F. Blane (1967), J. Pharm. Pharmacol 19, 367 and the intraperitoneal phenyl-p-benzoquinone in the mouse method of L. C. Hendershot and J. Forsaith (1959), J. Pharmac. exp. Ther. 125, 237.

Compounds useful against high intensities of pain were found to be active in the tail pressure test using the following technique. Male rats weighing 60–80 g. received either saline as controls or one of a logarithmic series of doses of the drug, either subcutaneously or orally 30 and 60 minutes respectively before determining pain thresholds. The animals were regarded as showing analgesia if they failed to squeal on application of a pressure greater than twice the mean pressure required to cause a vocal response in the controls. From the percentage showing analgesia at each dose level the $ED_{50}$ was calculated. Codeine and morphine are found to be active as analgesics in this test. The following table sets out results for this test for some representative compounds of the invention.

| R | $R^1$ | $R^2$ | $R^3$ | $ED_{50}$ mg./kg. S.C |
|---|---|---|---|---|
| Me | n-Pr | Me | n-Pr | 1.0 |
| Me | $CH_2$— | Me | n-Pr | 0.3 |
| H | n-Pr | Me | n-Pr | 0.024 |
| H | $CH_2CH=CH_2$ | Me | n-Pr | 0.033 |
| H | $CH_2$— | Me | n-Pr | 0.002 |
| H | $CH_2$— | Me | n-Am | 0.08 |
| Me | $CH_2$— | Me | i-Am | 0.54 |
| H | $CH_2$— | Me | i-Am | 0.03 |
| Me | n-Pr | Me | Cyclohexyl | 0.06 |
| Morphine | | | | 2.25 |

Compounds effective against moderate and low intensities of pain were found to be active in the rate antibradykinin test or the mouse intraperitoneal phenyl-p-benzoquinone test. The rat antibradykinin test was carried out by first determining the minimum dose of bradykinin required consistently to produce dextrorotation of the head and flexion of the right fore-limb for each rat. This dose was commonly 0.05 or 0.10 μg. and rats not responding to 0.50 μg. were discarded. Rats did not always squeak after these threshold doses of bradykinin and disappearance of the head rotation and fore-limb flexion were taken as the criteria for scoring an analgesic effect in animals after drug administration. Bradykinin was given as a solution of the pure synthetic peptide in 0.2 ml. of 0.9% saline and was washed in immediately with a further 0.2 ml. of saline. The response developed within about 5 seconds and persisted for about a further 10 seconds. Compounds under test were administered by oral, subcutaneous are intraperitoneal route, after which the established threshold dose of bradykinin was injected at regular intervals until the dose reponse returned. For any given drug and dose level the percentage of rats failing to respond to the analgesic stimulus was plotted against time. With all drugs the $ED_{50}$ values at the time of peak effect were estimated. The Hendershot and Forsaith test was carried out by injecting female mice with the drug under test or saline for control purposes at various times before an intraperitoneal injection of phenyl-p-benzoquinone. The dose of the drug required to reduce by 50% the number of abdominal stretches caused by the irritant action of the phenyl-p-benzoquinone was calculated by comparison with the controls. The following table sets out results for representative compounds by these two test methods with subcutaneous administration.

| R | R¹ | R² | R³ | ED₅₀ mg./kg. H & F | ED₅₀ mg./kg. Anti BK |
|---|---|---|---|---|---|
| H | CH₂-◁ | Me | Me | 0.03 | 2.3 |
| Me | CH₂CH=CH₂ | Me | Et | 2.2 | 4.9 |
| Me | CH₂-◁ | Me | Et | 3.6 | 2.5 |
| H | CH₂-◁ | Me | Et | 0.013 | 0.39 |
| H | CH₂CH=CH₂ | Me | n-Pr | 0.01 | 0.071 |
| H | CH₂-◁ | Me | i-Am | 0.012 | 0.036 |
| H | Et | Me | Me | 1.8 | 6.1 |
| Morphine | | | | 0.64 | 1.1 |
| Codeine | | | | 5.6 | 38.5 |

Morphine antagonizing ability was studied using the method of A. F. Green, G. K. Ruffell, and E. Walton, (1954) J. Pharm. Pharmacol. 6, 390. This test was similar to that described for the tail pressure test except that all rats were additionally injected with a dose of morphine causing analgesia in 100% of the animals. The dose of antagonist was determined which reduced the effect of the morphine to that which caused analgesia in 50% of the animals. The following table sets out results for represenative compounds using this test.

| R | R¹ | R² | R³ | ED₅₀ mg./kg. S.C. |
|---|---|---|---|---|
| H | CH₂=CH | Me | Me | 7.4 |
| Me | CH₂-◁ | Me | Me | 1.45 |
| H | CH₂-◁ | Me | Me | 0.01 |
| H | CH₂-◁ | Me | Et | 0.02 |
| Nalorphine | | | | 0.48 |

When mixed with suitable excipients or diluents, the compounds of this invention can be prepared as pills, capsules, tablets, powders, solutions, suspensions and the like for unit dosage, to simplify administration. As analgesias they will relieve pain by an action on the nerve centers within the central nervous system. As anti-tussives they depress the cough center. As antagonists they occupy the same sites in the brain as morphine-like drugs thus blocking access of the latter agents to their site of action.

The following are four of the most interesting compounds of the invention.

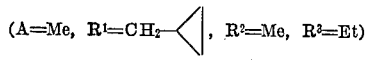
(A=Me, R¹=CH₂-◁, R²=Me, R³=Et)

is a weak morphine antagonist also possessing marked morphine-like agonist properties. For this reason its pharmacological properties most closely approximate to those of pentazocine amongst previously known analgesics. The parenteral dosage in humans would be in the range of 5 to 50 mg. When both drugs were administered orally in animals the former appeared considerably more potent than pentazocine.

(R=H, R¹=allyl, R²=Me, R³=Pr) is a potent analgesic. In animals it appears to cause considerably less respiratory depression than does morphine, methadone and several other narcotic analgesics. Its safety margin appears to be substantially greater than that of morphine and it may be expected to be of value in conditions (e.g. obstetrics) where the respiratory depressant effects of other narcotic analgesics limit their usefulness.

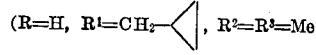
(R=H, R¹=CH₂-◁, R²=R³=Me approved name cyprenorphine) is a potent competitive antagonist of morphine approximately 40 times more potent than nalorphine. Its high potency makes it useful for antagonising the effects of narcotic analgesics in large animals where administration of the large amounts of nalorphine which would be necessary is not technically feasible.

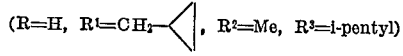
(R=H, R¹=CH₂-◁, R²=Me, R³=1-pentyl)

is a potent and very long acting central depressant and analgesic of great use in conditions where a long period of sedation and analgesia is required.

Experiments have been carried out which show that the secondary bases of this application, i.e. the compounds in which R¹ is hydrogen, are active analgesics when administered by the normal routes in experimental animals. This is a surprising finding, and could not have been predicted from any knowledge of the prior art, since no secondary bases of the morphine, morphinans, benzomorphan or pethidine series have ever previously been found to be analgesics when administered in this way. The following data relating to active secondary bases of this application were determined by the tail pressure method in rats after subcutaneous administration of the drug:

(a) 6,14-endoetheno - 7 - (2-hydroxy-2-propyl)tetrahydronorthebaine. ED₅₀—30.0 mg./kg.

(b) 6,14-endoetheno - 7 - (2-hydroxy-2-propyl)tetrahydronororipavine. ED₅₀—9.0 mg./kg.

(c) 6,14 - endoetheno - 7 - (2 - hydroxy - 2 - butyl) tetrahydronorthebaine. ED₅₀—5.6 mg./kg.

(d) 6,14 - endoetheno - 7 - (2 - hydroxy - 2 - pentyl) tetrahydronorthebaine. ED₅₀—0.49 mg./kg.

(e) 6,14 - endoetheno - 7 - (2 - hydroxy - 2 - pentyl) tetrahydronororipavine. ED₅₀—0.074 mg./kg.

What is claimed is:

1. Thebaine and oripavine derivatives of the formula:

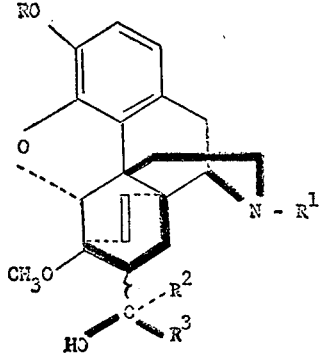

wherein:

R is hydrogen, methyl or acyl of $C_nH_{2n+1}CO$— where in $n$ is an integer from 1 to 3;

R¹ is hydrogen, alkyl or alkenyl of 2 to 8 carbon atoms, propargyl, cycloalkylmethyl of 4 to 6 carbon atoms such as cyclopropylmethyl or methylcyclopropylmethyl;

R² is hydrogen, alkyl of 1 to 3 carbon atoms, phenyl or tolyl; and

R³ is cycloalkyl of 5 to 7 carbon atoms, alkyl or alkenyl of up to 8 carbon atoms or alkyl or alkenyl of up to 8 carbon atoms substituted on any one of the carbon atoms numbered 1 to 4 (the carbon atom numbered 1 being adjacent to the carbon atom bearing the alcoholic hydroxy group) by cycloalkyl of 5 to 7 carbon atoms, phenyl, alkoxy of 1 to 3 carbon atoms, phenoxy or tetrahydrofuryl, provided that when R is hydrogen or when $R^1$ is hydrogen, cyclopropylmethyl or methylcyclopropylmethyl, $R^3$ does not contain the system

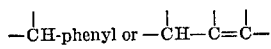

attached directly to the carbon atom bearing the alcoholic hydroxy group
and non-toxic pharmaceutically acceptable salts thereof.

2. A compound according to claim 1 wherein R is methyl, $R^1$ is cyclopropylmethyl, $R^2$ is methyl and $R^3$ is alkyl of 1 to 3 carbon atoms.

3. N - cyclopropylmethyl - 6,14 - endoetheno-7α-(2-hydroxy-5-methyl-2-hexyl)-tetrahydronororipavine.

4. N-cyclopropylmethyl-6,14-endoetheno-7-(2-hydroxy-2-propyl)-tetrahydronororipavine.

5. 6,14 - endoetheno - 7-(2-hydroxy-2-propyl)-tetrahydronorthebaine.

6. 6,14-endoetheno-7-(2-hydroxy-2-propyl)-tetrahydronororipavine.

7. 6,14 - endoetheno-7α-(2-hydroxy-2-butyl)-tetrahydronorthebaine.

8. 6,14 - endoetheno - 7α-(2-hydroxy-2-pentyl)-tetrahydronorthebaine.

9. 6,14 - endoetheno-7β-(2-hydroxy-2-pentyl)-tetrahydronorthebaine.

10. 6,14 - endoetheno-7α-(2-hydroxy-2-pentyl)-tetrahydronororipavine.

11. N - allyl - 6,14-endoetheno-7-(2-hydroxy-2-pentyl)-tetrahydronororipavine.

12. Thebaine and oripavine derivatives of the formula:

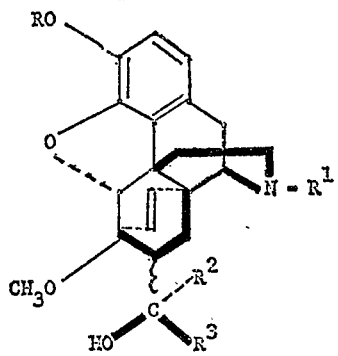

wherein:

R is hydrogen, methyl or acyl of $C_nH_{2n+1}CO$— wherein $n$ is an integer from 1 to 3;

$R^1$ is hydrogen, alkyl of 2 to 8 carbon atoms, allyl, methylallyl, or cycloalkylmethyl of 4 to 6 carbon atoms;

$R^2$ is hydrogen, alkyl of 1 to 3 carbon atoms, phenyl or tolyl; and $R^3$ is cycloalkyl of 5 to 7 carbon atoms, alkyl or alkenyl of up to 8 carbon atoms or alkyl or alkenyl of up to 8 carbon atoms substituted on any one of the carbon atoms numbered 1 to 4 (the carbon atom numbered 1 being adjacent to the carbon atom bearing the alcoholic hydroxy group) by cycloalkyl of 5 to 7 carbon atoms, phenyl, alkoxy of 1 to 3 carbon atoms, phenoxy or tetrahydrofuryl, provided that when R is hydrogen or when $R^1$ is hydrogen, cyclopropylmethyl or methycyclopropylmethyl, $R^3$ does not contain the system

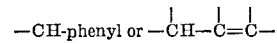

attached directly to the carbon atom bearing the alcoholic hydroxy group
and non-toxic pharmaceutically acceptable salts thereof.

References Cited

UNITED STATES PATENTS 3,285,914  11/1966  Gordon _____ 260—285

OTHER REFERENCES

Bentley, "Chemistry of the Morphine Alkaloids," Clarendon Press, 1954, pp. 290–1.

ALEX MAZEL, *Primary Examiner.*

D. G. DAUS, *Assistant Examiner.*

U.S. Cl. X.R.

260—192, 544; 424—260